US011276019B2

(12) United States Patent
Clancy et al.

(10) Patent No.: US 11,276,019 B2
(45) Date of Patent: *Mar. 15, 2022

(54) HIERARCHICAL SATELLITE TASK SCHEDULING SYSTEM

(71) Applicant: HawkEye 360, Inc., Herndon, VA (US)

(72) Inventors: T. Charles Clancy, Arlington, VA (US); Robert W. McGwier, Elliston, VA (US); Timothy James O'Shea, Arlington, VA (US); Nicholas Aaron McCarthy, Arlington, VA (US)

(73) Assignee: HawkEye 360, Inc., Herndon, VA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/676,840

(22) Filed: Nov. 7, 2019

(65) Prior Publication Data
US 2020/0175450 A1     Jun. 4, 2020

Related U.S. Application Data

(63) Continuation of application No. 16/167,001, filed on Oct. 22, 2018, now Pat. No. 10,474,976.
(Continued)

(51) Int. Cl.
*G06F 9/46* (2006.01)
*G06Q 10/06* (2012.01)
(Continued)

(52) U.S. Cl.
CPC ..... *G06Q 10/06316* (2013.01); *G06F 9/4881* (2013.01); *G06Q 10/06311* (2013.01);
(Continued)

(58) Field of Classification Search
CPC ................................................. H04B 7/18519
(Continued)

(56) References Cited

U.S. PATENT DOCUMENTS 5,619,695 A * 4/1997 Arbabi .................. G06F 9/4881
                                                           718/100
6,185,409 B1   2/2001 Threadgill et al.
(Continued)

FOREIGN PATENT DOCUMENTS

WO   WO 02/080013      10/2002
WO   WO 2007/143478    12/2007

OTHER PUBLICATIONS

PCT International Search Report and Written Opinion in International Application No. PCT/US2018/056886, dated Jan. 18, 2019, 12 pages.
(Continued)

*Primary Examiner* — Mehran Kamran
(74) *Attorney, Agent, or Firm* — Fish & Richardson P.C.

(57) ABSTRACT

A task scheduling system that can be used to improve task assignment for multiple satellites, and thereby improve resource allocation in the execution of a task. In some implementations, configuration data for one or more satellites is obtained. Multiple objectives corresponding to a task to be performed using the satellites, and resource parameters associated with executing the task to be performed using the satellites are identified. A score for each objective included in the multiple objectives is computed by the terrestrial scheduler based on the resource parameters and the configuration data for the one or more satellites. The multiple objectives are assigned to one or more of the satellites. Instructions are provided to the one or more satellites that cause the one or more satellites to execute the task according to the assignment of the objectives to the one or more satellites.

30 Claims, 10 Drawing Sheets

Related U.S. Application Data

(60) Provisional application No. 62/575,128, filed on Oct. 20, 2017.

(51) Int. Cl.
  G06F 9/48 (2006.01)
  H04B 7/185 (2006.01)

(52) U.S. Cl.
  CPC ... G06Q 10/06313 (2013.01); H04B 7/18502 (2013.01); H04B 7/18519 (2013.01)

(58) Field of Classification Search
  USPC .......................................................... 718/104
  See application file for complete search history.

(56) References Cited

U.S. PATENT DOCUMENTS

| | | | | |
|---|---|---|---|---|
| 6,405,186 B1* | 6/2002 | Fabre | ................... | G06Q 10/06 706/45 |
| 7,817,079 B1* | 10/2010 | Funk | .................... | G01S 13/917 342/41 |
| 9,996,810 B2* | 6/2018 | Augenstein | .......... | B64G 1/1021 |
| 2003/0054815 A1* | 3/2003 | Karabinis | .............. | H04B 7/216 455/427 |
| 2004/0158832 A1* | 8/2004 | Chechik | ............... | G01C 11/025 718/102 |
| 2008/0040190 A1 | 2/2008 | Khosla et al. | | |
| 2008/0244584 A1* | 10/2008 | Smith | .................... | G06Q 10/06 718/102 |
| 2008/0255908 A1* | 10/2008 | Smith | .............. | G06Q 10/06316 705/7.26 |
| 2009/0129311 A1* | 5/2009 | Bruas | .................. | H04B 7/18597 370/316 |
| 2010/0269117 A1* | 10/2010 | Hsu | ...................... | G06F 11/3466 718/103 |
| 2011/0125698 A1* | 5/2011 | Rome | .................... | G06Q 10/00 706/50 |
| 2012/0053995 A1* | 3/2012 | D'Albis | ................. | G06Q 10/10 705/7.39 |
| 2012/0158216 A1* | 6/2012 | Kim | ................... | H04B 7/18519 701/3 |
| 2014/0039963 A1* | 2/2014 | Augenstein | ............. | G06F 16/29 705/7.24 |
| 2014/0160970 A1* | 6/2014 | Beeler | ................ | H04B 7/18519 370/252 |
| 2018/0034536 A1* | 2/2018 | Trutna | ............... | H04B 7/18513 |
| 2018/0060808 A1* | 3/2018 | Borgerson | ............ | G06Q 50/30 |
| 2018/0150783 A1* | 5/2018 | Xu | .......................... | G06N 20/00 |
| 2018/0234166 A1* | 8/2018 | Peponides | ............ | H04L 47/823 |
| 2018/0294872 A1* | 10/2018 | Wakayama | ........ | H04B 7/18519 |
| 2018/0307949 A1* | 10/2018 | Garrison | ............. | G06K 9/6277 |
| 2018/0326583 A1* | 11/2018 | Baroudi | ................ | B25J 9/1661 |
| 2018/0341894 A1* | 11/2018 | Bunkheila | ................ | B64G 3/00 |

OTHER PUBLICATIONS

PCT International Preliminary Report on Patentability in International Application No. PCT/US2018/056886, dated Apr. 21, 2020, 7 pages.

* cited by examiner

HIERARCHICAL SATELLITE TASK SCHEDULING SYSTEM

CROSS-REFERENCE TO RELATED APPLICATIONS

This application is a continuation of U.S. application Ser. No. 16/167,001 filed Oct. 22, 2018, now allowed, which claims the benefit of priority under 35 U.S.C. § 119(e) of U.S. Provisional Application No. 62/575,128, filed on Oct. 20, 2017, and entitled "Hierarchical Space System Objective-Driven Satellite System Task And Resource Scheduling System" both of which is incorporated herein by reference in its entirety.

FIELD

The present specification generally relates to computer systems, and more particularly relates to satellite communication systems.

BACKGROUND

Some satellite systems use scheduling techniques that are directed to specific goals of the satellite systems and that produce impacts on their operations. For example, satellite systems often use, for transmit packet scheduling on radio communications links, standard quality of service (QoS) metrics as it would be performed terrestrially to minimize communications link latency for certain packets that are transmitted in real-time. For spatial scheduling, handoff systems are often used to maintain communications link coverage for mobile ground stations among multiple radio communication satellites in a practical way to maintain connectivity.

SUMMARY

This disclosure describes a task scheduling system that can be used, in general, to improve task assignment for satellite systems with multiple satellites, and thereby improve resource allocation in the execution of a task by multiple satellites. For example, the task scheduling system (referred to simply as the "system" in the following description) can improve resource allocation amongst multiple satellites in resource-constrained settings, such as in large-scale communications or monitoring operations. As another example, the system can distribute the execution of objectives for a particular task amongst multiple satellites to improve the likelihood of successful execution of large-scale tasks, e.g., tasks involving multiple cell towers, radios onboard ships, airborne radios, terrestrial broadcast towers, terrestrial vehicle radios, etc. Additionally, the system can jointly consider multiple constraints, e.g., time limitations, resource constraints, accuracy requirements, among others, to improve the likelihood that one or more task will be performed in a manner that takes advantage of satellite capabilities and/or opportunities. As a simplified example, the system can assign a greater number of tasks to a satellite with extensive processing capabilities relative to another satellite with limited processing capabilities. In this manner, the system utilizes hardware limitations and other operational information of individual satellites in identifying an optimal task schedule. As examples, an optimal task schedule can be a task schedule that minimizes the likelihood of an unsuccessful task execution, a task schedule that utilizes the lowest amount of a finite computing resource, e.g., processing, memory, storage, etc., in executing a task, a task schedule that utilizes a reduced amount of a finite satellite system resource, e.g., bus power, downlink capacity, etc., or a task schedule that is most likely to have a desired attribute, e.g., execution speed, accuracy, precision, favorable location/path, good signal-to-noise ratio, etc.

The system can be configured to coordinate tasks amongst different devices of a satellite system, e.g., terrestrial stations, aerial satellites, gateway devices, networking devices, among others. The system can also be configured to adjust and/or configure the operation of hardware components of each device, e.g., radio hardware, frequency-selective filters, low noise amplifiers, tuners, digitizers, antenna hardware, storage devices, communications. For example, the system can adjust the communications bandwidth, power, clock speed, computational load, antenna pattern, gain, or storage limitations of a particular device. The system can also coordinate operations performed by each device. As an example, the task planning system can coordinate satellite navigation, signal collection, signal transmission, data processing, emission detection, location tracking, among others.

As described herein, a "task" refers to a unit of execution or a unit of work of a computational process. In the context of satellite systems, a task can refer to the execution of operations that accomplishes one or more objectives associated with the task. As an example, a task can represent a process performed by a network of satellites over a terrestrial region of the earth to communicate with or monitor activity of a payload, e.g., a cargo ship, over a specified time period. In this example, the monitoring process can involve multiple objectives, such as characterizing the RF environment associated with the vicinity of the payload, tracking a path of the payload over the specified time period, transmitting received data (or processed forms thereof) to a terrestrial station, generating alerts or notifications if received data indicates an alarm condition, e.g., the cargo ship entering a restricted maritime region or broadcasting on an illegal frequency. As described herein, task objectives can be utilized by the task scheduling system to distribute operations specified within the task process amongst multiple satellites efficiently.

In one general aspect, a computer-implemented method can include: obtaining, by a terrestrial scheduler of a server system, configuration data for one or more satellites associated with the server system, wherein each satellite from among the one or more satellites comprises an aerial scheduler configured to exchange communications with the terrestrial scheduler; identifying, by the terrestrial scheduler, (i) multiple objectives corresponding to a task to be performed using the satellites, and (ii) resource parameters associated with executing the task to be performed using the satellites; computing, by the terrestrial scheduler, a score for each objective included in the multiple objectives based on the resource parameters and the configuration data for the one or more satellites, each score representing a prioritization of a corresponding objective from among the multiple objectives; assigning, by the terrestrial scheduler, the multiple objectives to one or more of the satellites based on the scores for the objectives; and providing, by the terrestrial scheduler and to the aerial schedulers of the one or more satellites, instructions that, when received by the one or more satellites, cause the one or more satellites to execute the task according to the assignment of the objectives to the one or more satellites.

One or more implementations can include the following optional features. For example, in some implementations, the instructions cause the one or more satellites to configure at least one of antennas or radio tuning parameters of the one or more satellites.

In some implementations, the scores for the objectives include a particular score for a particular objective that represents a predicted probability of successfully executing the particular objective.

In some implementations, the particular score for the particular objective is determined based on historical data representing prior executions of the particular objective.

In some implementations, the particular score for the particular objective is determined based on a probabilistic model associated with prior executions of the particular objective.

In some implementations, the scores for the objectives include a particular score for a particular objective that represents an estimated resource consumption associated with executing the particular objective.

In some implementations, the scores for the objectives include a particular score for a particular objective that represents an estimated resource cost associated with executing the particular objective.

In some implementations, the resource parameters include a particular resource parameter that specifies at least one of a network bandwidth or latency required to exchange data between a particular satellite and the server system.

In some implementations, the resource parameters include a particular resource parameter that specifies at least one of antenna or digitizer usage by a particular satellite.

In some implementations, the resource parameters include a particular resource parameter that specifies a power charge level of a particular satellite.

In some implementations, the resource parameters include a particular resource parameter that specifies a computational capacity of a particular satellite.

In some implementations, the resource parameters include a particular resource parameter that specifies a finite bandwidth of a particular satellite.

In some implementations, the resource parameters include a particular resource parameter that specifies a storage required on a particular satellite to perform a particular objective corresponding to the task.

In some implementations, the objectives corresponding to the task includes a particular objective specifying reception of emissions from a specified geospatial region or at a specified time window.

In some implementations, the objectives corresponding to the task include a first objective and a second objective. In such implementations, determining the score for each objective included in the multiple objectives includes determining a first score for the first objective and a second score for the second objective. Additionally, the method further includes determining a sequence to execute the first objective and the second objective based on values of the first score and the second score.

In some implementations, the method further includes: obtaining, by the terrestrial scheduler, execution data indicating that the objectives corresponding to the task have been performed by the one or more satellites; processing, by the terrestrial scheduler, the execution data to compute one or more metrics corresponding to the execution of the task by the one or more satellites; and generating, by the terrestrial scheduler, an execution report that includes at least one of the one or more execution metrics corresponding to the execution of the task by the one or more satellites.

In some implementations, the method further includes computing, by the terrestrial scheduler, an aggregate score for the task based on combining the scores computed for each objective included in the objectives corresponding to the task.

In some implementations, the multiple objectives include: a first objective to receive emission data that identifies a presence of a ship in a particular region of the Earth; or a second objective to monitor movement of other ships in multiple regions of the Earth that do not include the particular region.

In some implementations, the particular region of the Earth includes a particular maritime region and the multiple regions of the Earth comprise maritime regions that do not include the particular maritime region.

Other versions include corresponding systems, and computer programs, configured to perform the actions of the methods encoded on computer storage devices.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
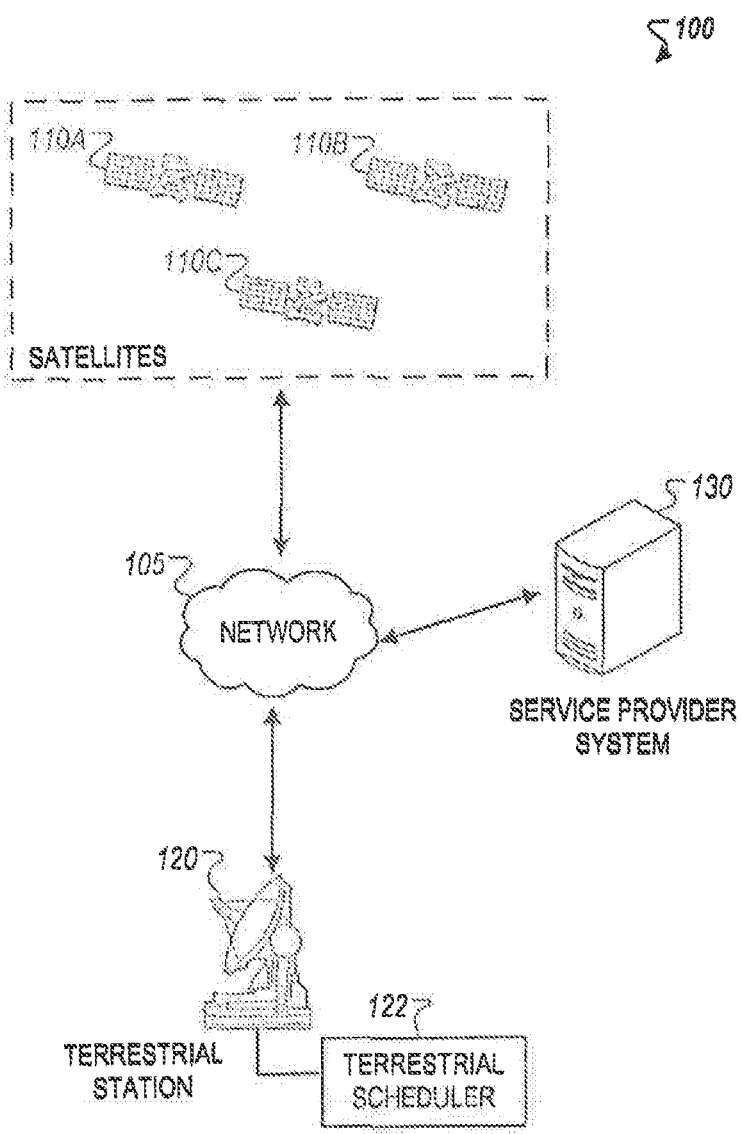
FIG. 1 is a schematic diagram that illustrates an example of a task planning system.

FIG. 1 is a schematic diagram that illustrates an example of a task scheduling system 100. The system 100 includes satellites 110A, 110B, and 110C within a satellite network, a terrestrial station 120, and a service provider system 130 connected over a network 105. The terrestrial station 120 includes a terrestrial scheduler 122.

The system 100 can be applied to improve task scheduling techniques described herein to improve the execution of tasks by satellite systems that operate in different technological contexts (e.g. constraint resources such as power, computation, physical access, storage, antennas and radios).

The system 100 can improve satellites in communicating with and monitoring global activity across air, land, and sea using radio frequency (RF) technology. For example, the system 100 can improve tasks relating to monitoring transportation activity and logistics tracking by enabling the satellites 110A, 110B, and 110C to detect, receive, identify, and localize target vessels of interest based on signals emanating from the specific vessels. As another example, the system 100 can improve tasks relating to emergency responses and search/rescue efforts by enabling the satellites 110A-110C to identify and localize distress alerts, and provide information to assist emergency responders. For instance, the satellites 110A-110C can map spectrum utilization before and after natural disasters such as hurricanes and landfalls, and provide time-sensitive information to first responders.

In other examples, the system 100 can improve tasks relating to communications interference detection by enabling the satellites 110A-110C to identify and/or localize RF interferers by surveying communications channels in a given area, anticipating legitimate signals, and identifying anomalies that likely represent RF interference. In some other examples, the system 100 can improve tasks relating to spectrum mapping by enabling the satellites 110A-110C to generate a global spectrum inventory and map processes that provide accurate and cost-effective utilization data to end-users such as government regulators or service providers.

Referring now to components of the system 100, the network 105 may be any type of network, including any combination of an Ethernet-based local area network (LAN), wide area network (WAN), a wireless LAN, various point to point, mesh or other forms of satellite communications links or networks, VPN connections, and the Internet. The network 105 enables data transmissions between the terrestrial station 120, the satellites 110A-110C, and the service provider system 130.

The satellites 110A-110C can be apparatuses that are placed into orbit around a celestial body, such as the earth, and configured to transmit, receive and/or relay information to the terrestrial station 120 over the network 105. The satellites 110A-110C can be used for different purposes based on the application of an associated satellite system. For example, the satellites 110A-110C can be Earth observation satellites, communication satellites, navigation satellites, weather satellites, or space telescopes. The orbits of the satellites 110A-110C can also vary depending on their purposes or other logistical constraints. For example, the satellites 110A-110C can be configured for a high earth orbit for weather monitoring, a medium earth orbit for observing high latitudes, or a low earth orbit for certain earth observations.

The terrestrial station 120 can be an earth radio that is configured for planetary communication with satellites or other airborne devices through the network 105 using a suitable satellite communication bus. The terrestrial station 120 is capable of transmitting and receiving radio frequency waveforms in the super high frequency, extremely high frequency bands (e.g., microwaves), or other radio frequency or optical bands in order to establish a telecommunications link over the network 105 with the satellites 110A-110C.

The terrestrial station 120 can include multiple software modules that enable the provisioning of communications services between the satellites 110A-110C and the service provider system 130. For example, the terrestrial station 120 includes the terrestrial scheduler 122, which generates a task execution plan that assigns one or more objectives of the task to one or more of the satellites 110A-110C. Task scheduling operations performed by the terrestrial scheduler 122 are discussed in detail with respect to FIGS. 2A-2C. Once a task execution plan has been developed, the terrestrial scheduler 122 can then assign or schedule the execution of objectives associated with a task to individual satellites from among the satellites 110A-110C. The objective and task scheduling operations performed by the terrestrial scheduler 122 are discussed in detail with respect to FIGS. 3A-3C.

The terrestrial scheduler 122 can monitor various types of information associated with the execution of a task by the satellites 110A-110C. For example, the terrestrial scheduler 122 can monitor a maximum signal power level, signal to noise ratio, or bit error rate to indicate a successfully executed a task, spatial constraints over which a task is valuable to a satellite system, or spatiotemporal constraints over which multiple observations by a satellite are helpful to provide a productive data output. In performing the task scheduling operations, the terrestrial scheduler 122 can consider probabilistic information including previous accuracy or success measures from recent observations by the satellites 110A-110C, among other types of historical information or information about specific emitters, movements or other activities from other sources (e.g. patterns of life of emitters on the ground, knowledge of telemetry, etc.).

The service provider system 130 can be a server system managed by associated with a satellite communications provider that provisions services to enable communications between the satellites 110A-110C and the terrestrial station 120. In some implementations, the service provider system 130 and the terrestrial station 120 can be managed by the same entity, e.g., a satellite communications provider, such that service provider system 130 is capable of directly accessing, controlling, and/or configuring the monitoring and communications operations performed by the terrestrial station 120. In such implementations, the terrestrial scheduler 122 can receive configuration data for the satellites 110A-110C from the service provider system 130 in executing the task scheduling techniques discussed in detail below.

Alternatively, in other implementations, the service provider system 130 and the terrestrial station 120 are managed by distinct entities. For example, the terrestrial station 120 can be managed by a satellite system operator that configures operation of the satellites 110A-110C, and the service provider system 130 can be managed by a third-party service provider that provides, for instance, software or other technology services, to the satellite system operator. In such implementations, the service provider system 130 can provide software that configures the terrestrial scheduler 122 to execute the task scheduling techniques discussed in detail below. In this regard, the terrestrial scheduler 122 can be after-market software that runs on computing devices associated with the terrestrial station 120.

In some implementations, the satellites 110A-110C each include aerial schedulers that coordinate operations performed by associated sensors based on data communications received from the terrestrial station 120. In such implementations, the architecture of the system 100 permits multiple hierarchical levels of task scheduling. For example, the terrestrial scheduler 122 can perform macro-level task scheduling that involving identification of high-level objectives for a task to be executed by a satellite system and assignment of the identified objectives to individual satellites. In this example, the aerial schedulers of the satellites 110A-110C receive instructions from the terrestrial scheduler 122 and perform micro-level task scheduling involving configuring sensors of a corresponding satellite. For instance, an aerial scheduler can identify one or more sequence of multiple operations to accomplish objectives assigned to a satellite, in some instances based on immediate feedback from the outcome of past operations, processing of task output, or satellite system status.

Figure 2A:
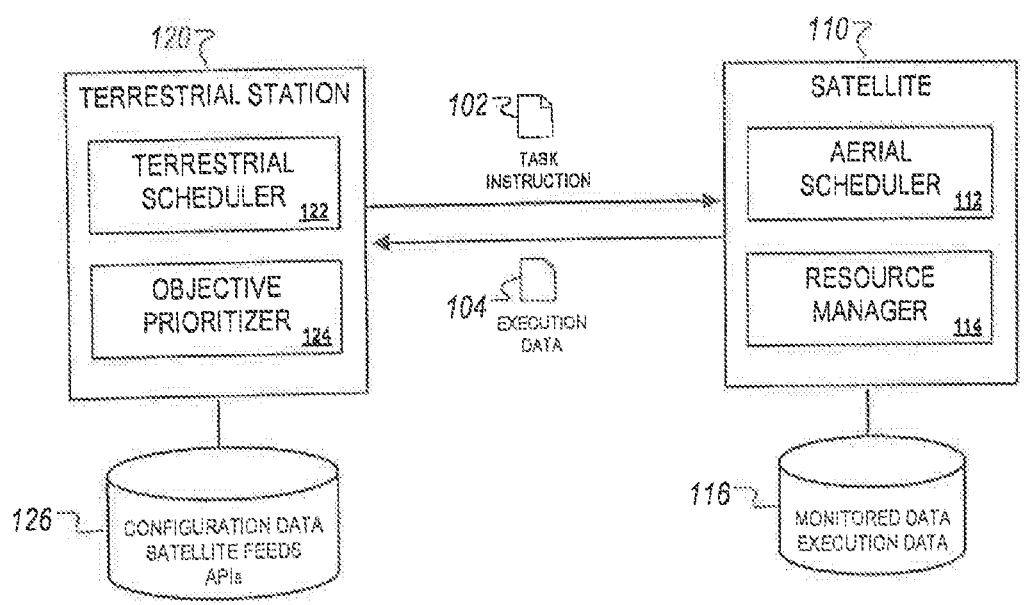
FIG. 2A is a block diagram that illustrates an example of communications between a terrestrial station and a satellite.

FIG. 2A is a block diagram that illustrates an example of communications between a terrestrial station 120 and a satellite 110. As depicted, the terrestrial station 120 includes a terrestrial scheduler 122 and an objective prioritizer 124. The terrestrial station 120 stores and accesses data 126, which includes configuration data, satellite feeds from previously executed tasks, and application programming interfaces (APIs) that enable communications with and/or control of the satellite 110 over a suitable communication bus. The satellite 110 includes an aerial scheduler 112 and a resource manager 114. The satellite 110 also stores and accesses data 116, which includes received or monitored data, processed data and execution data.

For example, the terrestrial scheduler 122 and the objective prioritizer 124 can be software modules that are executed on the terrestrial station 120. As described throughout, the terrestrial scheduler 122 can identify a set of objectives for a task to be executed by the satellite 110 (from among multiple tasks to be executed). Each objective can be associated with operations to be performed by the satellite 110 in association with the task. The objective prioritizer 124 evaluates the objectives identified by the terrestrial scheduler 122 based on a set of resource parameters to compute a score for each objective. As discussed below, a score computed for an objective represents a prioritization of the objective relative to other objectives for a given task. For example, an objective with a high prioritization has a greater impact on the overall successful execution of a task, whereas an objective with a low prioritization corresponds to a routine maintenance operation and therefore has a low impact on the overall successful execution of the task. In this example, the objective prioritizer 124 computes a higher score for the high prioritization objective than a score computed for the low prioritization objective.

Likewise, the aerial scheduler 112 and the resource manager 114 can be software modules that are executed on the satellite 110. The aerial scheduler 112 can identify hardware components of the satellite 110 to perform operations corresponding to objectives assigned to the satellite 110 by the terrestrial scheduler 122. In some instances, the aerial scheduler 112 performs micro-level task scheduling by assigning objectives to individual sensors, as shown in the example depicted in FIG. 2C. The resource manager 114 manages the execution of operations as assigned by the aerial scheduler 112 based on information specified by the data 116. For example, the resource manager 114 determines processing requirements for operations to be performed by components of the satellite 110, which is then used by the aerial scheduler 112 to distribute operations to individual components in a manner that optimizes resource consumption.

During a typical task execution process, the terrestrial station 120 initially provides a task instruction 102 to the satellite 110. The task instruction 102 can include objectives that are assigned to the satellite, parameters for executing operations corresponding to the assigned objectives, and other types of configuration information. For example, in an emission monitoring task, the task instruction 102 can specify a RF spectrum to monitor, the frequency of emissions to monitor over a time period, an RF signature representing a target object to be monitored, coordinates representing a monitored area, and/or metrics to be determined from the received data (e.g. RSSI, SNR, BER) and thresholds, logic, or probabilistic models indicating success thereon.

The aerial scheduler 112 processes the task instruction data collected by the satellite 110 102 to identify objectives that have been assigned to the satellite 110. The aerial scheduler 112 then identifies operations corresponding to the assigned objectives that are to be performed by components of the satellite 110. In certain instances, where the task instruction 102 assigns multiple objectives to the satellite 110, the aerial scheduler 112 can distribute objectives to different components of the satellite 110 based on resource information provided by the resource manager 114.

The resource manager 114 monitors the satellite 110 as it executes operations corresponding to objectives specified in the task instruction 102. For example, the resource manager 114 can monitor the satellite 110 including operations in real-time, or alternatively, periodically over specified time intervals, e.g., hourly, daily, weekly, based on the type of task being performed. The resource manager 114 collects monitored data (e.g., telemetry) and received data produced by the operations determined by the aerial scheduler 112 (e.g., digitized RF data). Received data is then aggregated into execution data 104 to represent performance information associated with specific satellite operations or received information. As examples, the execution data 104 can include processing load over a specified time period, storage volume, an indication of whether the operations were successfully performed, and signal quality metrics, among other types of information. In some instances, the aerial scheduler 112 may already have put in place operations to further process received data into processed data. In other instances, the aerial scheduler 112 may examine objectives from the task instruction 102 together with monitored data, received data and execution data from the resource manager and then "self-task" the satellite system with operations to further process the received data into processed data. The resource manager 114 derives execution data from all such operations.

The satellite 110 relays the execution data 104 to the terrestrial station 120 for processing and analysis. For example, the terrestrial scheduler 122 can utilize the execution data 104 to determine whether the satellite 110 has successfully performed an operation specified in the task instruction 102, whether data collected by the satellite 110 requires further analysis, or whether an objective should be re-assigned to another satellite or scheduling time because of constraints of the capabilities of the satellite 110. In some instances, information included in the execution data 104 is extracted and stored in historical log data and used to adjust the generation of subsequent task plans. For example, if the execution data 104 indicates that the satellite 110 has repeatedly failed to successfully perform an operation corresponding to an objective specified in the task instruction 102, then the terrestrial scheduler 122 can use this information to re-assign the objective to another satellite during the task scheduling process for a similar task, or to make adjustments to the antenna, radio, or processing parameters of subsequent attempts.

Figure 2B:
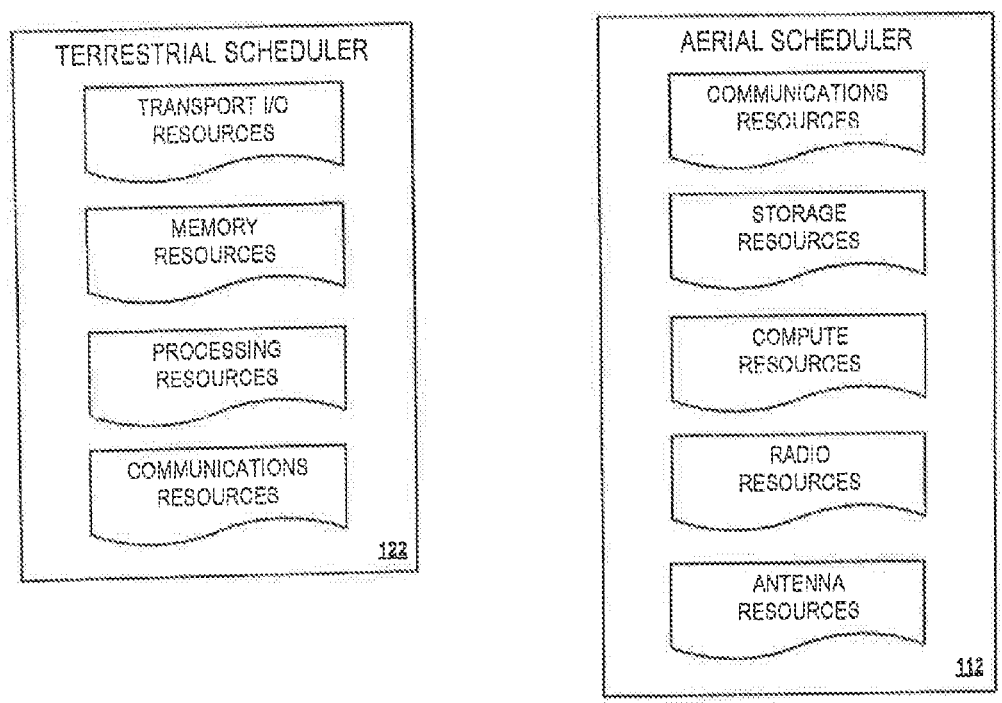
FIG. 2B is a block diagram that illustrates examples of resources monitored by a terrestrial scheduler and an aerial scheduler of a task planning system.

FIG. 2B is a block diagram that illustrates examples of resources monitored by a terrestrial scheduler 122 and an aerial scheduler 112 of a task scheduling system. As discussed above, the terrestrial scheduler 122 can be a software module that operates on the terrestrial station that performs a set of primary task scheduling processes on the ground. The aerial scheduler 112 can be a software module that operates on an airborne component, e.g., satellites 110A-110C, and performs a set of secondary task scheduling processes based on data received from the terrestrial scheduler 122.

The terrestrial scheduler 122 monitors resources of the terrestrial station 120, such as transport input/output (I/O) resources (e.g., traffic bandwidth, quality of service on communication downlinks), antenna and radio availability, memory resources (e.g., memory storage space), and communications resources (e.g., processor usage, power usage, field-programmable gate array (FPGA) operations). The aerial scheduler 112 monitors resources of a satellite, such as communications resources, storage resources, computing resources. The aerial scheduler 112 also monitors radio resources (e.g., tuners, filters, digitizers of the satellite), and antenna and spacecraft resources (e.g., pointing or orientation azimuth and elevation). The aerial scheduler 112 can also monitor location and view resources (e.g., boresight latitude, longitude, antenna selection) that reflects the current footprint of the antenna and emitters of the satellite. When scheduling a task (or multiple tasks), the aerial scheduler 112 applies a function, such as an objective function, cost function, or probability determination, to allocate objectives to components of the satellite. Likewise, the terrestrial scheduler 122 also applies similar techniques in assigning objectives to satellites, albeit in a higher-level hierarchy within the overall task scheduling process. For example, the terrestrial scheduler 122 performs macro-level scheduling, which involves assigning objectives to satellites, whereas the aerial scheduler 112 performs micro-level scheduling, which involves distributing objectives of a satellite to individual components of the satellite.

In some implementations, the aerial scheduler 112 can operate semi-autonomously in scheduling and planning operations of a satellite (or multiple components of a satellite) without receiving additional instructions from the terrestrial scheduler 122. For example, if a satellite is used in a circumstance with a significant transmission latency or infrequent contact with ground stations, then the terrestrial scheduler 122 may transmit an instruction that includes generalized configuration information such as the objectives to be accomplished by the satellite, or additional parameters to models (e.g. probabilistic models or logical rules) to express these objectives and/or surrounding phenomena (e.g. emitter models, telemetry models, propagation models, spacecraft models). In this example, due to the significant transmission latency, periodic communications between the aerial scheduler 112 and the terrestrial scheduler 122 is not achievable due to network constraints (e.g. communications may be sporadic and unpredictable when telemetry, spatial opportunities, link conditions, and other factors permit). To address this, once the aerial scheduler 112 receives an initial transmission from the terrestrial scheduler 122 with assigned objectives, the aerial scheduler 112 can distribute the objectives autonomously and without requiring further transmissions with the terrestrial scheduler 122. In some instances, the aerial scheduler 112 is capable of monitoring operations of the satellite and adjusting objective assignments including during time periods where the aerial scheduler 112 is unable to relay execution data back to the terrestrial scheduler 122. In this regard, the aerial scheduler 112 can be configured to adjust initial objective assignments and scheduling to improve the likelihood of successful execution of operations even when communications with the terrestrial scheduler 122 are not feasible. In other instances, the aerial scheduler 112 may examine the monitored data, execution data, received data or processed data 116 resulting from performed operations and assign follow-on operations in a results-driven manner to best satisfy the objectives originally sent by the terrestrial scheduler 122 in a task instruction 102.

Figure 2C:
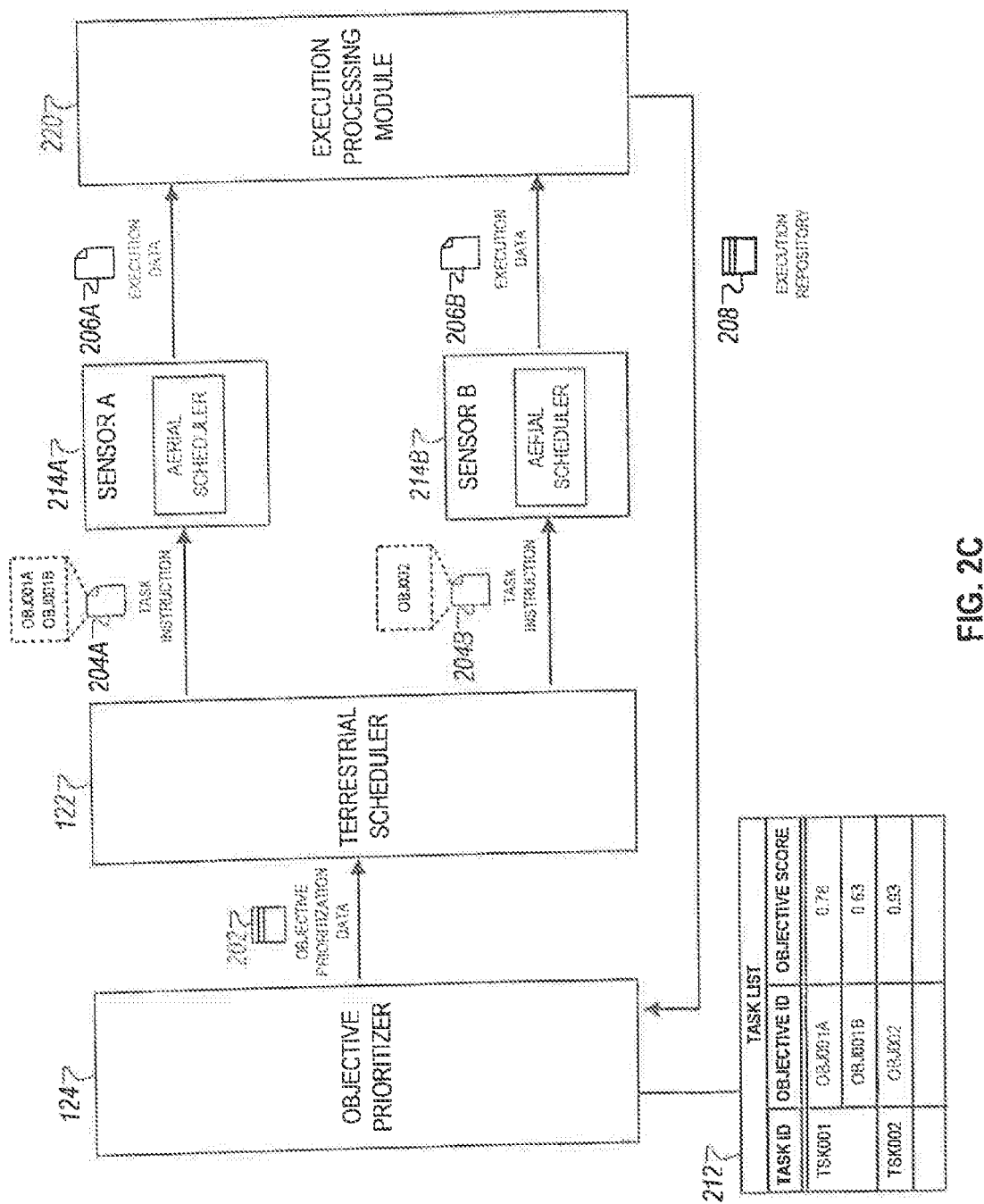
FIG. 2C is a block diagram that illustrates an example of a process for prioritizing multiple objectives to be executed by a satellite.

FIG. 2C is a block diagram that illustrates an example of a process for prioritizing multiple objectives to be executed by a satellite. In this example, the terrestrial scheduler 122 and the objective prioritizer 124 are implemented on a ground segment of a task scheduling system, e.g., on the terrestrial station 120 (e.g. a data center, corporate headquarters, or a ground facility, among others). In contrast, the sensors 214A and 214B, and the execution processing module 220 are implemented on an airborne component of the system 100, e.g., the satellites 110A-110C.

The objective prioritizer 124 initially generates a task list 212 that identifies tasks to be performed by the satellite system and a set of objectives for each task. In the example depicted, the task list 122A includes two tasks with distinctive identifiers, e.g., "TSK001" and "TSK002." In this example, task "TSK001" includes two objectives, e.g., "OBJ001A" and "OBJ001B," and task "TSK002" include a single objective, e.g., "OBJ002."

The objective prioritizer 124 assigns a score to each objective included in the task list 122A. The score can represent a relative prioritization of an individual objective from among other objectives for a particular task. For example, the score can represent a predicted likelihood that a satellite will successfully execute an operation corresponding to the objective. As another example, the score is an objective score that represents the impact of a particular objective to successfully execute a task, or a relative importance of successful completion of different tasks or objectives. In some examples, the objective score represents an estimated resource consumption associated with executing an operation corresponding to an objective. For instance, an objective that involves greater processing requirements can be assigned a higher objective score relative to another objective that involves lower processing requirements.

The terrestrial scheduler 122 generates task instructions for sensors of one or more satellites based on the objective prioritization data 202. For instance, the terrestrial scheduler 122 generates a task instruction 204A for sensor 214A and a task instruction 204B for sensor 214B. In this example, the terrestrial scheduler 122 assigns multiple tasks to a single satellite, and each task instruction specifies objectives associated with the corresponding task. For example, the task instruction 204A specifies objectives "OBJ001A" and "OBJ001B," which are associated with a task "TSK001" and the task instruction 204B specifies objective "OBJ002," which is associated with a task "TSK002."

In the example depicted in FIG. 2C, multiple tasks are executed by different satellite sensors, e.g., sensors 214A and 214B. In this example, each sensor is configured by a different aerial scheduler, which coordinates the execution of objectives assigned by the terrestrial scheduler 122. For example, the aerial scheduler for sensor 214A can configure the operation of the sensor 214A in executing operations corresponding to objectives "OBJ001A" and "OBJ001B."

Once the sensors 214A and 214B have completed performing operations for the assigned objectives, the sensors 214A and 214B provide execution data 206A and 206B, respectively, to the execution processing module 220. The execution data 206A and 206B can represent information associated with the execution of operations relating to assigned objectives, such as the time and/or location required to perform the operations, whether the objectives were successfully completed, among others. The execution processing module 220 extracts the information included in the execution data 206A and 206B and accumulates the information into the execution repository 208.

The execution repository 208 can be a historical log of prior operations executed by either an individual satellite or one or more satellites of a satellite system that are managed by the terrestrial station 120. This may include descriptive information about those operations including time, telemetry, inputs, outputs, parameters, craft configuration, information about emitters, or other related phenomena or activities. The execution repository 208 can be maintained by the terrestrial station 120 to adjust task scheduling for subsequent tasks (and smaller versions may be maintained onboard satellites). For example, as shown in FIG. 2C, the execution repository 208 can be provided to the objective prioritizer 124 so that, in a subsequent planning processing, information from prior executions can be used to improve objective prioritization, scheduling and assignment. For instance, if the execution repository 208 indicates that the sensor 214B took longer than expected to perform the operation corresponding to objective "OBJ002," then the objective prioritizer 124 may assign a higher score for the objective "OBJ002" in a subsequent task scheduling process. The higher score may reflect, for instances, that the processing requirements for accomplishing the objective is higher than originally anticipated in the prior task scheduling process.

Figure 3A:
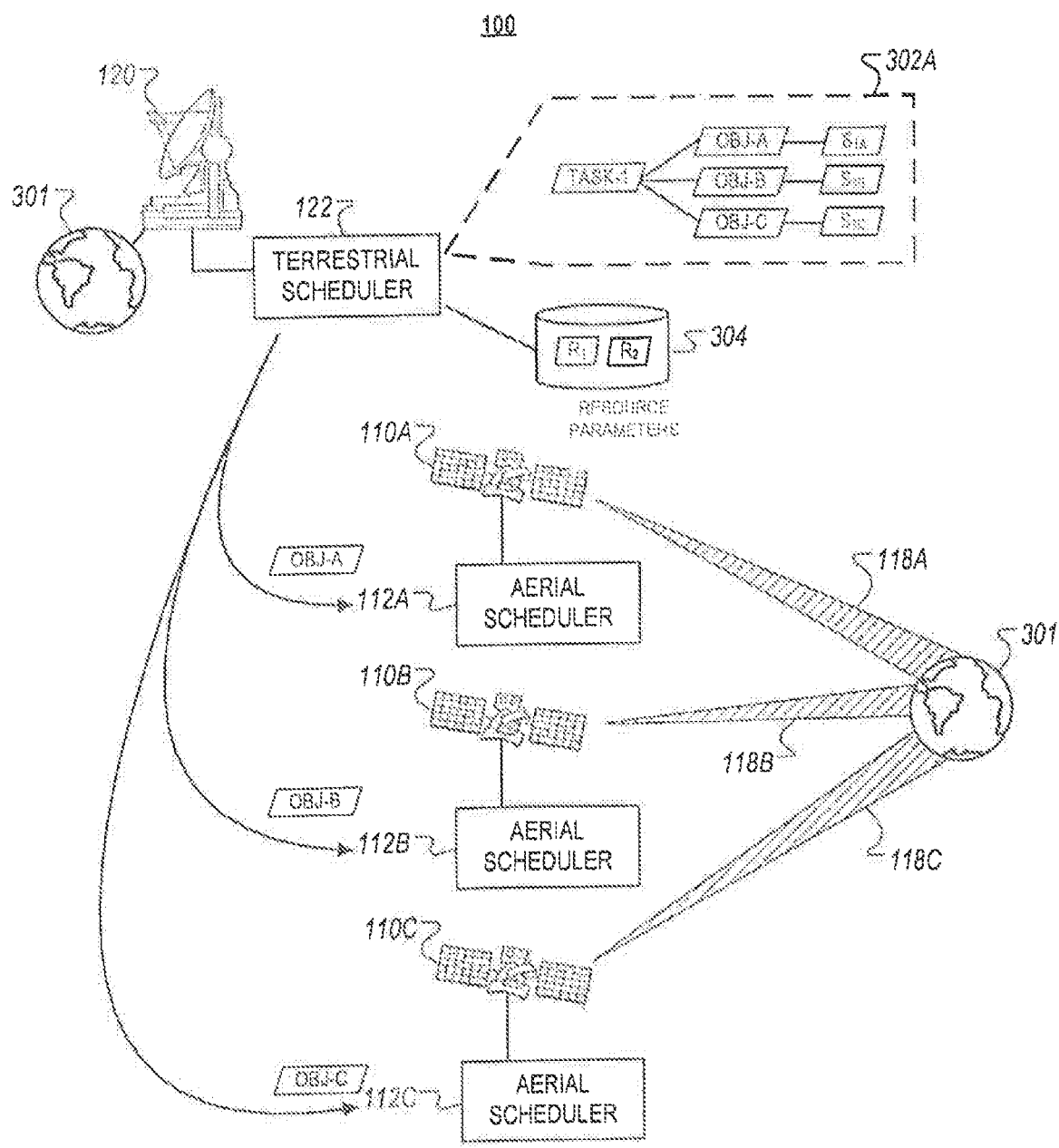
FIG. 3A is a schematic diagram that illustrates an example of a process for assigning different objectives of a task to multiple satellites within a satellite communication network.
Figure 3B:
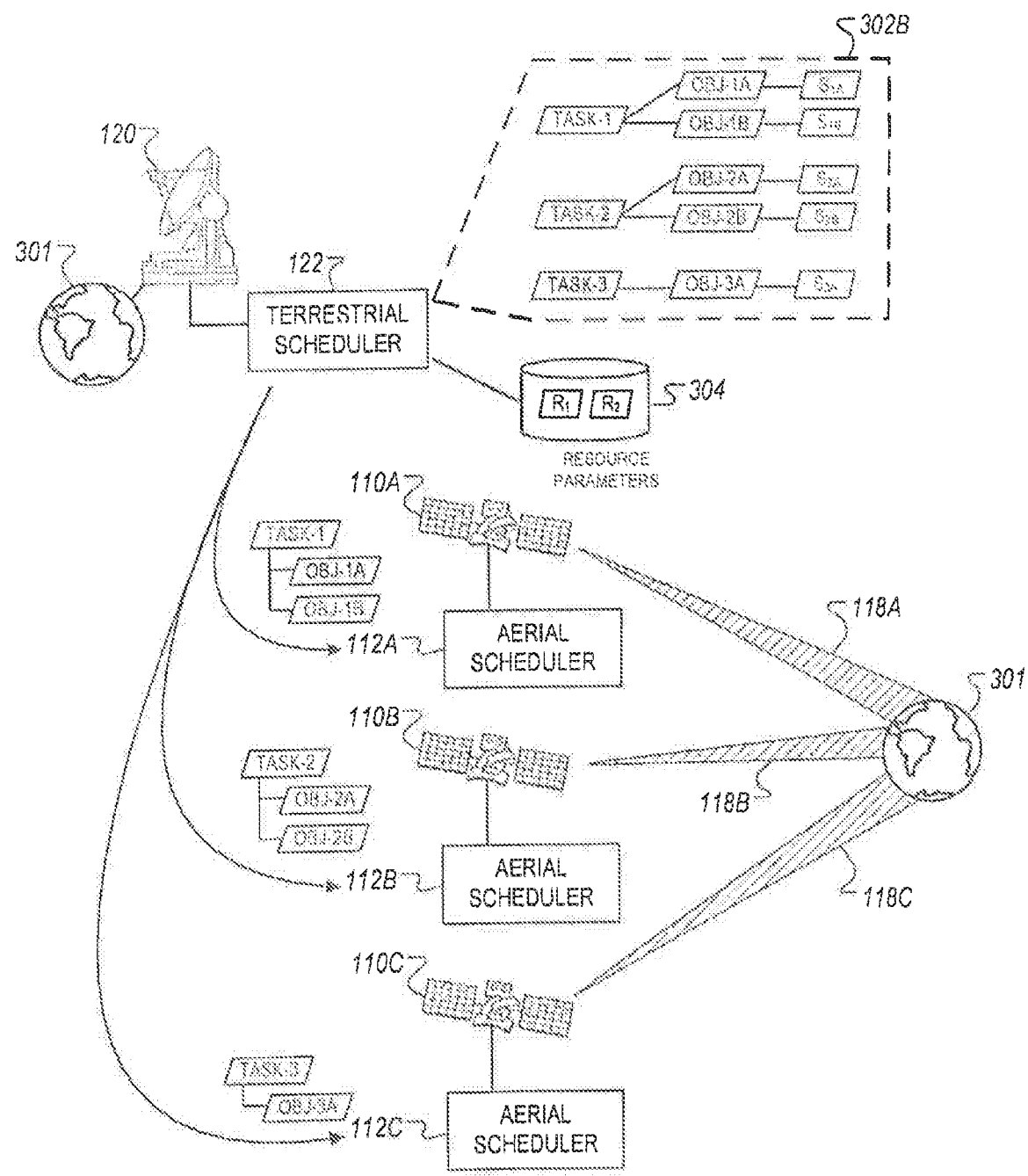
FIG. 3B is a schematic diagram that illustrates an example of a process for assigning different tasks to multiple satellites within a satellite communication network.
Figure 3C:
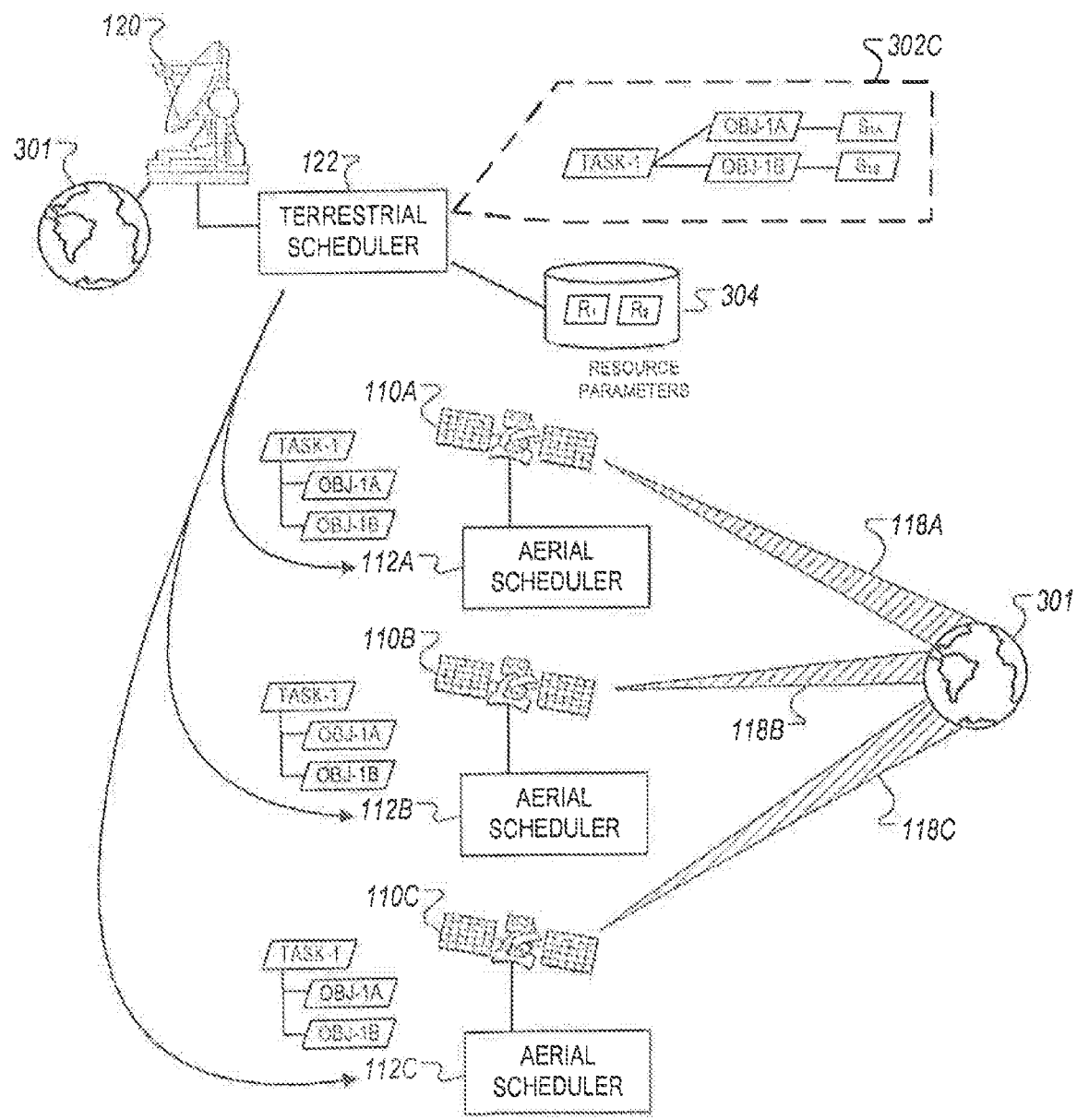
FIG. 3C is a schematic diagram that illustrates an example of a process for redundantly assigning the same task to multiple satellites within a satellite communication network.

FIGS. 3A-3C are schematic diagrams that illustrate examples of task distribution schemes that can be applied by the system 100 to distribute the execution of task in a hierarchical manner. In these examples, the terrestrial station 120 is a radio station on the ground of the earth 301. The terrestrial station 120 includes a terrestrial scheduler 122 that performs task scheduling as described herein. The terrestrial scheduler 122 accesses resource parameters 304 to generate a hierarchical task plan for a task to be performed by satellites 110A, 110B, and 110C.

The satellites 110A, 110B, and 110C are associated with aerial schedulers 112A, 112B, and 112C, respectively. The aerial schedulers 112A, 112B, and 112C communicate with the terrestrial scheduler 122 to configure a corresponding satellite to execute one or more objectives specified by the task plan. The satellites 110A-110C can be a collection of low Earth orbit satellites in some instances flying in formation, that receive information from specific radio signals worldwide to provide high-precision radio frequency transceiving, mapping and analytics. The satellites 110A-110C collect radio footprints 118A, 118B, and 118C, respectively over a specified region of the earth 301. The satellites 110A-110C receive data representing the radio footprints 118A-118C and transmit the received data to the terrestrial station 120 over a communication bus, e.g., the network 105 (see FIG. 1).

FIG. 3A depicts an example of a process for assigning different objectives of an individual task to multiple satellites. In this example, a task plan 302A specifies multiple objectives for a single task, and the terrestrial scheduler 122 assigns a single objective to each of the satellites 110A-110C such that the task is collectively executed by the satellites 110A-110C.

In some implementations, the task plan 302A specifies a hierarchical task execution structure such that execution of operations relating to task objectives are distributed amongst multiple satellites 110A-110C. This type of structure can be used to improve the likelihood that all objectives are achieved during a task process, and helps ensure the most important objectives are accomplished, but do not result in starvation or unfair/disproportional suppression of the execution of less important objectives/operations/tasks. As an example, assigning objectives to the multiple satellites 110A-110C in a distributed manner prevents the likelihood that certain objectives are not accomplished due to possible system overload (e.g. starvation or unavailability of resources such as power, processors, storage, radios, or antennas) when a single satellite is assigned multiple objectives. As another example, objectives can be assigned to satellites based on their processing capabilities such that highest priority objectives are assigned to satellites with the strongest processing capabilities to improve the likelihood of successful execution.

The task plan 302A represents the task to be executed as element "TASK" and objectives of the task are represented as elements "OBJ-A," "OBJ-B," and "OBJ-C." Each objective is associated with a prioritization score, which is represented in the task plan 302A as elements "$S_{1A}$," "$S_{1B}$," and "$S_{1C}$." For example, each prioritization score can be computed by the terrestrial scheduler 122 based on various factors including a likelihood of an objective being successfully executed by one or more of the satellites 110A, 110B, or 110C. In some implementations, the various factors also include an estimated resource consumption associated with executing an objective, or an estimated cost associated with executing the objective, e.g., a monetary cost, a computational cost, a storage cost, among others.

In the example depicted in FIG. 3A, the aerial scheduler 112A configures the satellite 110A to perform one or more operations associated with objective "OBJ-A," the aerial scheduler 112B configures the satellite 110B to perform one or more operations associated with objective "OBJ-B," and the aerial scheduler 112C configures the satellite 110C to perform one or more operation associated with objective "OBJ-C."

FIG. 3B depicts an example of a process for assigning different tasks to multiple satellites. In this example, a task plan 302B specifies multiple tasks, and a set of objectives associated with each task. The terrestrial scheduler 122 assigns one or more task to each of the satellites 110A-110C such that objectives associated with each task are executed by corresponding satellites.

In some implementations, the task plan 302B specifies a hierarchical task execution structure such that execution of operations relating to multiple tasks are distributed amongst multiple satellites 110A-110C. This type of structure can be used to coordinate the operation of multiple satellites collectively so that the operations of an individual satellite can be adjusted based on the operation of other satellites within a satellite communication network. For example, three satellites can be coordinated to perform a monitoring operation over a terrestrial region to monitor weather patterns, or to communicate in a coordinated way with a ground system. In this example, a first satellite can be assigned a task to monitor humidity levels, a second satellite can be assigned to a task to collect terrestrial images, and a third satellite can be assigned to cloud formation patterns. If data collected by the third satellites indicate that cloud formation patterns are likely to reduce visibility of the ground, then the system can use the data collected by the third satellite to temporarily disable the second satellite to prevent the collection go undesirable or unusable terrestrial images. Coordinating the operations of multiple satellites thereby can be used to improve resource consumption in resource-constrained circumstances.

The task plan 302B includes the multiple tasks to be executed that are illustrated as elements "TASK-1," "TASK- 2," and "TASK-3." The task plan 302B further includes two objectives of "TASK-1" illustrated as elements "OBJ-1A" and "OBJ-1B," two objectives of "TASK-2" illustrated as elements "OBJ-2A" and "OBJ-2B," and the single objective of "TASK-3" illustrated as element "OBJ-3A." Each objective is associated with a prioritization score that is illustrated as one of as elements "$S_{1A}$," "$S_{1B}$," "$S_{1C}$," "$S_{2A}$," "$S_{2B}$," or "$S_{3A}$" included in the task plan 302B.

In the example depicted in FIG. 3B, the aerial scheduler 112A configures the satellite 110A to perform task "TASK-1" and its corresponding objectives "OBJ-1A" and "OBJ-1B." The aerial scheduler 112B configures the satellite 110B to perform task "TASK-2" and its corresponding objectives "OBJ-2A" and "OBJ-2B" and the aerial scheduler 112C configures the satellite 110C to perform "TASK-3" and its corresponding objective "OBJ-3A."

FIG. 3C depicts an example of a process for redundantly assigning a task to multiple satellites. In this example, a task plan 302C specifies a high priority task, and a set of objectives associated with the high-priority task. The terrestrial scheduler 122 assigns the same task to each of the satellites 110A-110C to improve the likelihood that at least one of the satellites 110A-110C successfully executes the assigned task. This type of task assignment and/or distribution scheme can be used if the task to be performed requires a high priority task that requires successful execution and/or involves a low success rate when attempted to be performed by an individual satellite. The redundant distribution of the task thereby increases the number of attempts by the satellites 110A-110C to successfully execute the task.

Figure 4:
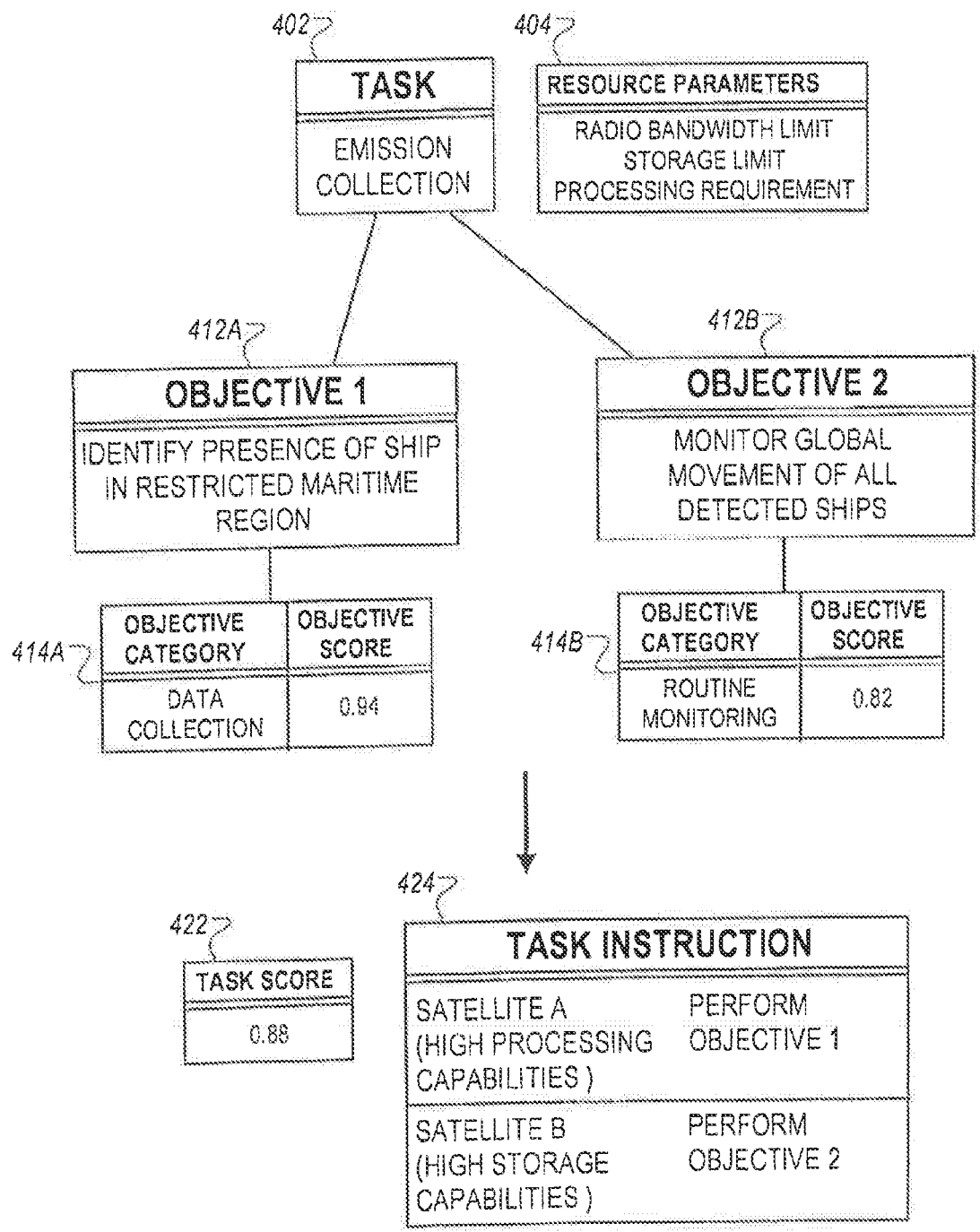
FIG. 4 is a schematic diagram that illustrates an example of a hierarchical representation of a task to be executed by a satellite.

FIG. 4 is a schematic diagram that illustrates an example of a hierarchical representation of a task to be executed by a satellite. In this example, a task scheduling system, e.g., system 100, generates a task plan for a task 402 that includes objectives 412A and 412B. The system generates objective data 414A and 414B for objectives 412A and 412B, which are defined based on resource parameters 404. The objective data 414A and 414B specify an objective categorization and a prioritization score for a corresponding objective.

The task scheduling system generates a task instruction 424 based on the objective data 414A and 414B. The task instruction 424 assigns each objective to one or more satellite from among multiple satellites of a satellite communication network. The task instruction 424 is used to assign an objective to one or more satellite as discussed above in reference to FIGS. 3A and 3B. The system also computes a task score 422 representing a complexity associated with executing the task.

In the example depicted in FIG. 4, the task to be executed by the satellite system involves emission reception by geospatial satellites that orbit around the Earth. In this example, the satellites monitor radio emissions in various geospatial regions for tracking transportation activity, e.g., movement of ship vessels across seas. The satellite system can deploy satellites to multiple regions or orbits such that the network collectively monitors maritime regions in different locales, e.g., in the Pacific and Atlantic oceans.

Due to the scope of the monitoring task, the satellite scheduling system monitors objectives associated with individual regions, as well as other objectives relating to global monitoring. For example, the objective 412A represents an operation that relates an individual region, i.e., a subset of satellites, whereas objective 412B represents an operation that relates to multiple regions, i.e., all satellites. The hierarchical task structure depicted in FIG. 4 enables the system to coordinate different types of operations that are involved in a large-scale monitoring task.

The system 100 generates the task plan for the task 402 based on evaluating resource parameters 404 as described above in reference to FIGS. 2A and 2B. For example, the system can evaluate radio bandwidth limits of satellites included in the satellite system, storage limits on-board the satellites, processing requirements for executing operations associated with the task 402, among others. In the example depicted in FIG. 4, the system evaluates resource parameters 404 in relation to the objectives 412A and 412B in computing a prioritization score for each objective.

For example, the system 100 computes a prioritization score for objective 412A with a value of "0.94" and a prioritization score for objective 412B with a value of "0.82." In this example, the prioritization score reflects a relative importance of an objective in relation to the overall execution of the task 402. For instance, a higher prioritization score for objective 412A relative to the prioritization score for the objective 412B reflects a determination by the system that execution of the objective 412A has greater importance to the task 402 than execution of the objective 412B. In this example, objective 412A represents a higher priority monitoring operation since received data is used to trigger an alarm or alert condition, e.g., unauthorized access to a restricted maritime region. In contrast, objective 412B represents a lower priority monitoring operation since data is received as a part of a routine calibration procedure that is not related to security.

The system utilizes the value of the prioritization score for each objective to generate the task instruction 424 to increase the likelihood that objective 412A is successfully performed relative to objective 412B, but the system accounts for the joint utility of both objectives. For example, as shown in FIG. 4, the task instruction 424 assigns objective 412A to satellite A, which has high processing capabilities but assigns objective 412B to satellite B, which has high storage capabilities. In this example, objective 412A is assigned to satellite A since the system determines that the identification of a specified object with emission data involves image and data processing that are likely to be improved if performed by a satellite with high processing capabilities. Once the system has allocated the high-priority objective to a satellite (e.g. the satellite best able to succeed in performing that objective), it assigns objective 412B to satellite B since the system determines that monitoring global movement of all detected ships among all monitored regions involves data accumulation that is likely to require significant storage. In this example, attempting to perform both objective and objective 2 on separate satellites suited to performing only one or the other objective has a higher joint utility than, for instance, assigning the higher-priority objective to both satellites.

In some implementations, the system computes the task score 422 to characterize the execution of a task in numerical terms. In the example depicted in FIG. 4, the task score 422 is computed based on combining the prioritization scores for objectives 412A and 412B. In this example, the task score 422 represents an overall prioritization for the task 402 as a function of the prioritizations of the objectives 412A and 412B. The task score 422 can be used to, for example, prioritize execution of tasks from among multiple tasks. For example, a task relating to emergency response services can be prioritized over the task 402 since the task involves life-critical data where responsiveness can affect mortality rates.

Figure 5:
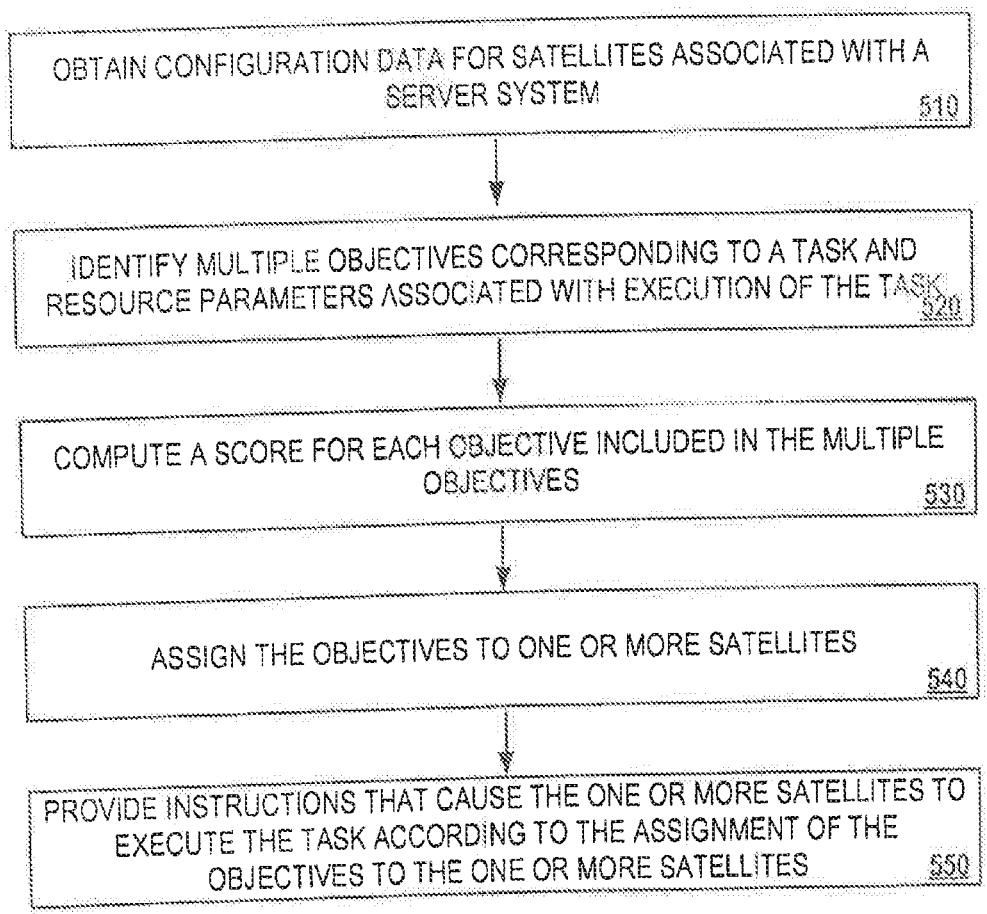
FIG. 5 is a flowchart that illustrates an example of a process for scheduling objectives of a task to one or more satellites.

In other examples, the task score can represent other characteristics that are useful for task scheduling and prioritization. For instance, the task score can represent a likelihood of successfully performing a task so that the system can schedule tasks with higher likelihoods of success to be performed prior to other tasks with lower likelihoods of success to efficiently utilize computational resources, or other constrained resources. In other instances, the task score can represent an estimated cost of executing a task so that tasks with lower costs are executed prior to execution of tasks with higher cost to improve cost allocation FIG. 5 is a flowchart that illustrates an example of a process 500 for scheduling objectives of a task to one or more satellites. Briefly, the process 500 can include operations of obtaining configuration data for satellites associated with a server system (510), identifying multiple objectives corresponding to a task and resource parameters associated with execution of the task (520), computing a score for each objective included in the multiple objectives (530), assigning the objectives to one or more of the satellites (540), and providing instructions that cause the one or more satellites to execute the task according to the assignment of the objectives to the one or more satellites (550).

In some implementations, the process 500 is described below in reference to system 100, although other types of task scheduling systems can be configured to perform the operations of the process 500. For example, the process 500 can be performed by a server system managed by a satellite communications service provider that manages the network 105 depicted in FIG. 1. Additionally, although the descriptions below reference the terrestrial scheduler 122 for simplicity, in some implementations, multiple components of the system 100 can collectively perform the operations of the process 500. For example, the terrestrial scheduler 122 can compute prioritization scores for objectives of a task to be executed whereas aerial schedulers on-board satellites can generate task instruction based on data communications from the terrestrial scheduler 122. In such examples, one or more operations of the process 500 are executed by a ground segment of the system 100, e.g., by the terrestrial station 120, while other operations of the process 500 are executed by an aerial segment of the system 100, i.e., by the satellites 110A-110C.

In more detail, the process 500 can include the operation of obtaining configuration data for satellites associated with a server system (510). For example, the terrestrial station 120 can obtain configuration data for satellites 110A-110C, which exchange communications with the terrestrial station 120 over the network 105. The configuration data indicates hardware information for the satellites 110A-110C, such as radio emitters, antenna configuration, storage capabilities, and processing capabilities, among others.

In some implementations, an objective of a task represents an emission reception operation from a specified geospatial coordinate at a specified time point or region. For example, as shown in FIG. 4, the task 402 includes an objective 412A representing emissions reception that indicates the presence of a ship in a restricted maritime region. As another example, the task 402 includes an objective 412B representing routine data reception for all satellites that perform other types of monitoring operations in association with the task 402.

The process 500 can include the operation of identifying multiple objectives corresponding to a task and resource parameters associated with execution of the task (520). For example, the terrestrial scheduler 122 of the terrestrial station 120 can identify objectives for a task based on identifying the processes to be performed by satellites in association with a task. In some instances, objectives are manually specified by a system administrator or operator that configures a satellite system or schedule entries. For example, a satellite service provider can specify service-related objectives relating to a quality of service (QoS), data acquisition and/or processing standards, communication protocols, among others. In other instances, objectives are automatically identified by the terrestrial station 120 based on identifying the type of task to be performed or based on various forms of input requirements from users, requirements processes, or other information sources. For example, the terrestrial station 120 can access a task repository that classifies the types of tasks to be executed by satellites, operations that are commonly performed with each type of task, or previously performed objectives with each type of task. In some instances, the terrestrial station 120 periodically updates the terrestrial station 120 after the execution of each task, e.g., after receiving execution data from satellites.

The terrestrial station 120 also identifies resource parameters associated with executing the task to be performed using the satellites. In some instances, a parameter can specify a network bandwidth, data rate or latency required to exchange data between a satellite and the terrestrial station 120. For example, the parameter can identify an average packet size for data packets exchanged between a satellite and a terrestrial scheduler 122 and latency associated with packet transmission. As another example, a parameter can specify storage required on a satellite to perform an operation for an objective corresponding to the task. For example, the parameter can identify a file size for optical data or radio data received by the satellite during a monitoring operation.

The process 500 can include the operation of computing a score for each objective included in the multiple objectives (530). For example, the terrestrial station 120 can compute a score for each objective identified in 520. As discussed throughout, the computed score can represent a prioritization of an objective relative to other objectives for a task. For example, as shown in FIG. 4, the score for an objective can represent its importance to a task. In the example depicted in FIG. 4, the system computes a higher score for objective 412A relative to the score computed for objective 412B since objective 412A relates to detection of unauthorized access in a restricted maritime region, i.e., a prioritized monitoring operation, and objective 412B relates to a routine monitoring operation conducted for data maintenance purposes.

As described throughout, in different implementations, the score computed for an objective can reflect types of prioritization. For example, in some implementations, the score can represent the likelihood of successfully executing an operation corresponding to the task. In other implementations, the score can represent a cost associated with executing an operation associated with the objective, as described above.

In some implementations, the score computed for objectives can be used to determine a sequence of operations to perform corresponding to the objectives. For instance, in some examples where multiple objectives are assigned to a satellite, the terrestrial station 120 uses the computed scores to determine which objective should be executed first. In such instances, an objective that has a higher computed score can be configured to be executed prior to an objective that has a lower computed score. In this manner, the terrestrial station 120 uses scores for objectives as a prioritization scheme to ensure most important objectives are performed prior to lesser important objectives, unless the likelihood, resource cost, and prioritization of the less objective is such that it outweighs the higher priority task (e.g. very low resource cost vs very low likelihood and high resource cost of the higher priority objective).

The process 500 can include the operation of assigning the objectives to one or more of the satellites (540). For example, the terrestrial station 120, through the use of the terrestrial scheduler 122, can assign objectives to satellites of a satellite communication network. In some instances, such as the example depicted in FIG. 3A, the terrestrial station 120 assigns a single objective to each satellite so that execution of the task is distributed by different satellites. In other instances, such as the example depicted in FIG. 3B, the terrestrial station 120 assigns multiple objectives to each satellite. In some other instances, a single objective can be assigned to multiple satellites to establish dependencies amongst multiple satellites in executing operations corresponding an objective. For example, an objective can include two operations that are performed sequentially or in parallel by two satellites. The various task plan distribution techniques described herein can be various depending on, for example, the type of task, and resource constraints for the satellite system, among others.

The process 500 can include the operation of providing instructions that cause the one or more satellites to execute the task according to the assignment of the objectives to the one or more satellites (550). For example, the terrestrial station 120 can provide instructions to the satellites 110A-110C. As depicted in FIG. 2C, the instruction can be provided to the satellites through data communications between the terrestrial scheduler 122 and aerial schedulers of the satellites 110A-110C. In some instances, such as the example depicted in FIG. 2C, a satellite includes multiple aerial schedulers for different sensors. In such instances, the satellite can provide different instructions to each aerial scheduler that configures a component associated with the aerial scheduler from among the multiple aerial schedulers. In other instances, a satellite includes a single aerial scheduler that configures the entire satellite.

In some implementations, the process 500 can include additional or alternative operations that are not depicted in FIG. 5. For instance, the process 500 can include operations relating to processing execution data after a satellite has performed an assigned objective, as shown in FIG. 2C. In such instances, the terrestrial station 120 can obtain execution data from a satellite once it has completed an assigned objective. The terrestrial station 120 can process the execution data to compute metrics corresponding to the execution of an objective. For example, the metrics can include a time for the satellite to successfully execute the objective, emissions wavelengths detected during a monitoring operation, a number of attempts prior to the satellite successfully executing the objective, among others. The terrestrial station 120 can accumulate the execution data and generate an execution report that provides a summary of a satellite's execution of an assigned objective or reports summarizing the execution of many objectives, types of objectives, and their associated performance metrics. The execution report can be provided to a user, such as a system administrator associated with the terrestrial station 120.

Additionally, or alternatively, the execution report can be stored as historical data within execution logs that are used by the terrestrial scheduler 122 to identify patterns or relationships in the execution of prior tasks or objectives or other phenomena occurring on the ground or elsewhere. The historical data within the execution logs can be used by the terrestrial scheduler 122 to improve the planning and/or scheduling of subsequent tasks or objectives. For example, if the execution logs indicate that a particular satellite has repeatedly failed to successfully execute an objective, then the terrestrial scheduler 122 may prevent the assignment of the objective to the particular satellite when generating a task plan for a similar task or modify parameters or configuration of the task in the future. As another example, if the execution logs indicate that execution of an objective by a satellite has degraded over time, the terrestrial scheduler 122 may determine that the likelihood of the satellite successfully executing the objective in a subsequent task may be lower than previously anticipated without considering the historical data.

Figure 6:
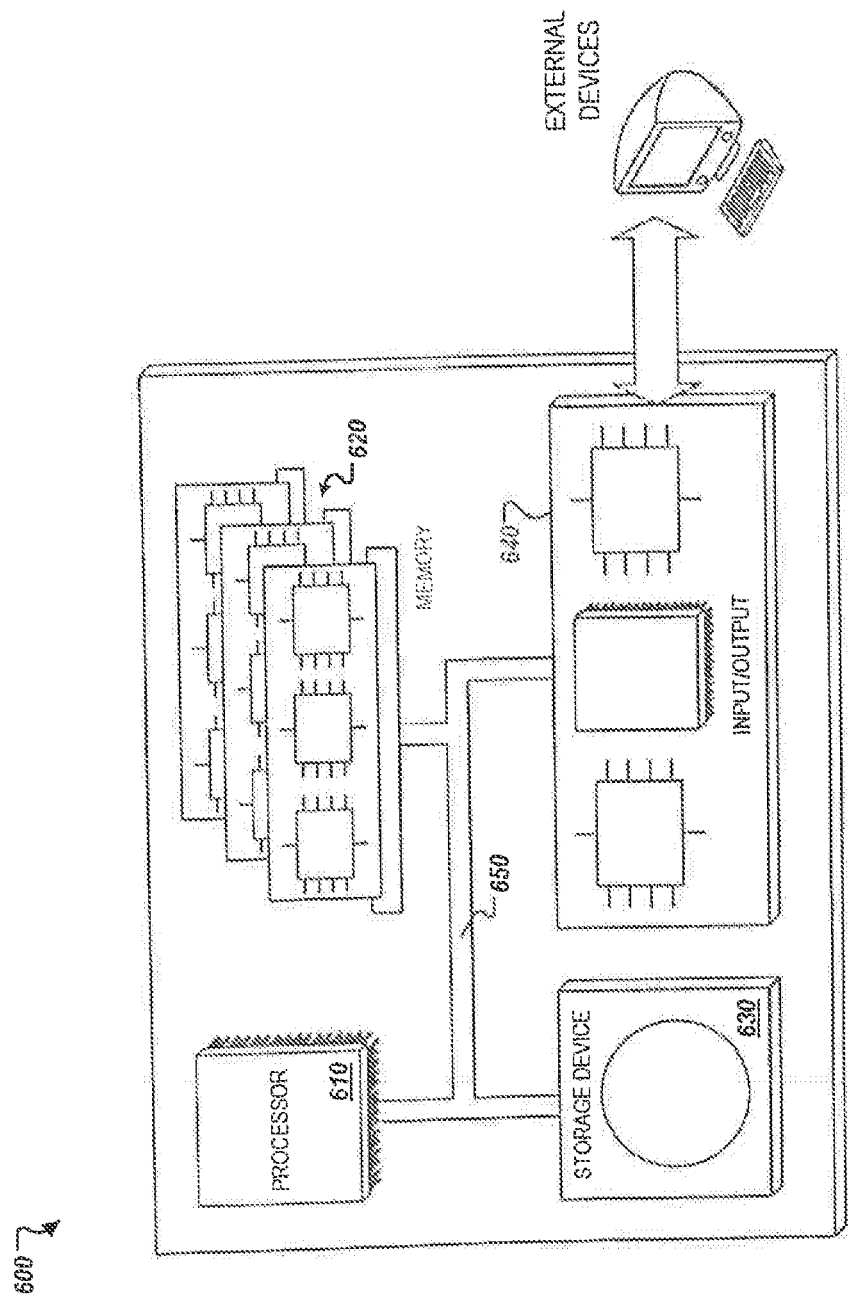
FIG. 6 illustrates a schematic diagram of a computer system applicable to the computer-implemented methods and other techniques described herein.

FIG. 6 is a schematic diagram of a computer system applicable to the computer-implemented methods and other techniques described herein. In some implementations, a system 600 includes a computer that performs the operations described in association with the computer-implemented methods described previously. In some implementations, computing systems and devices and the functional operations described in this specification can be implemented in digital electronic circuitry, in tangibly embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, embedded computers, satellite payload computers, field programmable gate arrays (FPGAs), and other appropriate computers, including computer systems installed on base units or pod units of modular vehicles or spacecraft. The system 600 can also include mobile devices, such as personal digital assistants, cellular telephones, smartphones, spacecraft payloads, and other similar computing devices. Additionally, the system can include portable storage media, such as, Universal Serial Bus (USB) flash drives, SD Cards, board mounted memory units, among others. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. In some implementations, multiple components of the system 100 are interconnected to one another. For example, the processor 610, the memory 620, the storage device 630, and the input/output device 640 are interconnected through a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor (e.g. an ARM processor, an ultra-scale Zinc processor, etc.).

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640 in some instances.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, a solid-state drive, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces. In other implementations, the systems may be unmanned embedded systems, where inputs may consist of sensors such as radios and/or imagers, and input/output with users may occur principally through network links or connections such as Ethernet, or radio links such as X-band digital transceivers.

Various implementations of the systems and methods described here can be realized in digital electronic circuitry, integrated circuitry, specially designed ASICs (application specific integrated circuits), field programmable gate arrays (FPGAs) digital signal processors (DSPs), computer hardware, firmware, software, and/or combinations of such implementations. These various implementations can include implementation in one or more computer programs that are executable and/or interpretable on a programmable system including at least one programmable processor or digital logic device, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Interaction with a user may also occur over a remote network connection.

The systems and techniques described here can be implemented in a computing system that includes a back end component, e.g., as a data server, or that includes a middleware component, e.g., an configuration server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet. The system may also be implemented within an embedded system such as a spacecraft payload.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, read-only memory (ROM), electrically erasable read-only memory, (EEPROM)random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   identifying, by one or more processors, (i) multiple objectives corresponding to one or more tasks to be performed using a plurality of satellites, and (ii) hardware resource parameters associated with execution of the one or more tasks using the plurality of satellites;
   computing, by the one or more processors, a score for each objective included in the multiple objectives based at least on the hardware resource parameters, each score representing a prioritization of a corresponding objective from among the multiple objectives;
   based on the scores for the multiple objectives:
      allocating, by the one or more processors, a first subset of the multiple objectives to a first satellite included in the plurality of satellites, and
      allocating, by the one or more processors, a second subset of the multiple objectives to a second satellite included in the plurality of satellites,
      wherein the first and second subsets of the multiple objectives each include at least one objective that is not included in the other subset;
   causing, by the one or more processors, the first satellite to perform a first operation corresponding to the first subset of the multiple objectives; and
   causing, by the one or more processors, the second satellite to perform a second operation corresponding to the second subset of the multiple objectives.

2. The method of claim 1, wherein causing the first satellite to perform the first operation comprises transmitting, to the first satellite, a first instruction that, when received by the first satellite, causes the first satellite to perform the first operation.

3. The method of claim 2, wherein transmitting the first instruction comprises transmitting the first instruction to a first aerial scheduler in the first satellite.

4. The method of claim 1, wherein the hardware resource parameters comprise one or more of
   storage space associated with performance of at least one operation associated with the one or more tasks,
   processor usage associated with performance of at least one operation associated with the one or more tasks,
   power usage associated with performance of at least one operation associated with the one or more tasks,
   network bandwidth associated with performance of at least one operation associated with the one or more tasks,
   a file size of data transferred during performance of at least one operation associated with the one or more tasks, or
   data transmission latency associated with performance of at least one operation associated with the one or more tasks.

5. The method of claim 1, wherein computing the score for each objective comprises computing the score based on a likelihood of the objective being successfully executed.

6. The method of claim 1, wherein the scores include a first score corresponding to a first objective of the multiple objectives, the method comprising:
   obtaining, by the one or more processors, data reflecting prior performance of a prior operation corresponding to a prior objective; and
   computing, by the one or more processors, the first score based on the data reflecting the prior performance.

7. The method of claim 6, wherein the data reflecting the prior performance comprises at least one of a time consumed by the prior performance, or an indication of whether the prior performance was successful.

8. The method of claim 6, wherein obtaining the data reflecting the prior performance comprises monitoring at least one of a signal power level, a signal to noise ratio, or a bit error rate associated with the prior performance.

9. The method of claim 1, wherein allocating the first subset of the multiple objectives to the first satellite and the second subset of the multiple objectives to the second satellite is performed based on respective execution capabilities of the first satellite and the second satellite.

10. The method of claim 1, wherein the multiple objectives corresponding to the one or more tasks comprise measuring radio frequency signal emissions from emitters in a specified geospatial region or during a specified time window.

11. The method of claim 1, wherein the multiple objectives corresponding to the one or more tasks comprise a first objective and a second objective, and wherein the method comprises:
    determining, by the one or more processors, a sequence in which to execute respective operations corresponding to the first objective and the second objective based on a first score corresponding to the first objective and a second score corresponding to the second objective.

12. The method of claim 1, comprising:
    obtaining, by the one or more processors, execution data indicating that operations corresponding to the multiple objectives have been performed by the plurality of satellites; and
    determining, by the one or more processors, based on the execution data, one or more metrics corresponding to performance of the operations; and
    generating, by the one or more processors, an execution report that includes at least one of the one or more metrics.

13. The method of claim 12, wherein the one or more metrics include at least one of times consumed by at least one satellite of the plurality of satellites in successfully completing the objectives, radio frequency signal wavelengths detected by the plurality of satellites, or a number of attempts by at least one satellite of the plurality of satellites used to complete the objectives.

14. The method of claim 1, wherein the multiple objectives comprise at least one of:
    a first objective to measure radio frequency signal emissions that identify a presence of a first emitter in a specified region of Earth, or
    a second objective to monitor movement of other emitters in one or more other regions of Earth that do not include the specified region.

15. The method of claim 14, wherein the specified region and the one or more other regions comprise maritime regions, and
    wherein the first emitter and the other emitters comprise emitters on board ships.

16. A system comprising:
one or more computers; and
one or more storage devices storing instructions that, when executed by the one or more computers, cause the one or more computers to perform operations comprising:
identifying (i) multiple objectives corresponding to one or more tasks to be performed using a plurality of satellites, and (ii) hardware resource parameters associated with execution of the one or more tasks using the plurality of satellites;
computing a score for each objective included in the multiple objectives based at least on the hardware resource parameters, each score representing a prioritization of a corresponding objective from among the multiple objectives;
based on the scores for the multiple objectives:
allocating a first subset of the multiple objectives to a first satellite included in the plurality of satellites, and
allocating a second subset of the multiple objectives to a second satellite included in the plurality of satellites,
wherein the first and second subsets of the multiple objectives each include at least one objective that is not included in the other subset;
causing the first satellite to perform a first operation corresponding to the first subset of the multiple objectives; and
causing the second satellite to perform a second operation corresponding to the second subset of the multiple objectives.

17. A non-transitory, computer-readable medium storing one or more instructions that, when executed by one or more processors, cause the one or more processors to perform operations comprising:
identifying (i) multiple objectives corresponding to one or more tasks to be performed using a plurality of satellites, and (ii) hardware resource parameters associated with execution of the one or more tasks using the plurality of satellites;
computing a score for each objective included in the multiple objectives based at least on the hardware resource parameters, each score representing a prioritization of a corresponding objective from among the multiple objectives;
based on the scores for the multiple objectives:
allocating a first subset of the multiple objectives to a first satellite included in the plurality of satellites, and
allocating a second subset of the multiple objectives to a second satellite included in the plurality of satellites,
wherein the first and second subsets of the multiple objectives each include at least one objective that is not included in the other subset;
causing the first satellite to perform a first operation corresponding to the first subset of the multiple objectives; and
causing the second satellite to perform a second operation corresponding to the second subset of the multiple objectives.

18. A method comprising:
identifying, by one or more processors, (i) multiple objectives corresponding to one or more tasks to be performed using a plurality of satellites, (ii) prioritization scores representing respective prioritizations of the multiple objectives, and (iii) hardware resource parameters associated with execution capabilities of the plurality of satellites, including first hardware resource parameters of a first satellite of the plurality of satellites and second hardware resource parameters of a second satellite of the plurality of satellites;
based on the prioritization scores and based on a joint utility of objective completion given the first hardware resource parameters and the second hardware resource parameters:
allocating, by the one or more processors, a first subset of the multiple objectives to the first satellite, and
allocating, by the one or more processors, a second subset of the multiple objectives to the second satellite, wherein the first and second subsets of the multiple objectives each include at least one objective that is not included in the other subset;
causing, by the one or more processors, the first satellite to perform a first operation corresponding to the first subset of the multiple objectives; and
causing, by the one or more processors, the second satellite to perform a second operation corresponding to the second subset of the multiple objectives.

19. The method of claim 18, wherein causing the first satellite to perform the first operation comprises transmitting, to the first satellite, a first instruction that, when received by the first satellite, causes the first satellite to perform the first operation.

20. The method of claim 19, wherein transmitting the first instruction comprises transmitting the first instruction to a first aerial scheduler in the first satellite.

21. The method of claim 18, wherein the first subset of the multiple objectives includes a first objective and the second subset of the multiple objectives includes a second objective, a first prioritization score corresponding to the first objective being higher than a second prioritization score corresponding to the second objective, and
wherein allocating the first subset of the multiple objectives to the first satellite and the second subset of the multiple objectives to the second satellite comprises setting a first likelihood of successful completion of the first objective to be higher than a second likelihood of successful completion of the second objective.

22. The method of claim 18, wherein the first subset of the multiple objectives includes a first objective and the second subset of the multiple objectives includes a second objective, a first prioritization score corresponding to the first objective being higher than a second prioritization score corresponding to the second objective, and
wherein allocating the first subset of the multiple objectives to the first satellite and the second subset of the multiple objectives to the second satellite is based on the first hardware resource parameters including a greater quantity of a particular type of hardware resource than is included in the second hardware resource parameters.

23. The method of claim 18, comprising determining the joint utility by applying the first hardware resource parameters and the second hardware resource parameters to an objective function or cost function.

24. The method of claim 18, wherein the hardware resource parameters comprise at least one of antenna availability of at least one satellite of the plurality of satellites, digitizer resources of at least one satellite of the plurality of satellites, power charge level of at least one satellite of the plurality of satellites, computational capacity of at least one satellite of the plurality of satellites, network bandwidth of at least one satellite of the plurality of satellites, or computational storage of at least one satellite of the plurality of satellites.

25. The method of claim 18, comprising:
obtaining, by the one or more processors, data reflecting prior performance of a prior operation corresponding to a prior objective; and
determining, by the one or more processors, the joint utility based on the data reflecting the prior performance.

26. The method of claim 25, wherein the data reflecting the prior performance comprises past successes or failure by the first satellite.

27. The method of claim 18, wherein the multiple objectives comprise at least one of:
a first objective to measure emissions that identify a presence of a first emitter in a specified region of Earth, or
a second objective to monitor movement of other emitters in one or more other regions of Earth that do not include the specified region.

28. The method of claim 27, wherein the specified region and the one or more other regions comprise maritime regions.

29. A system comprising:
one or more computers; and
one or more storage devices storing instructions that, when executed by the one or more computers, cause the one or more computers to perform operations comprising:
identifying (i) multiple objectives corresponding to one or more tasks to be performed using a plurality of satellites, (ii) prioritization scores representing respective prioritizations of the multiple objectives, and (iii) hardware resource parameters associated with execution capabilities of the plurality of satellites, including first hardware resource parameters of a first satellite of the plurality of satellites and second hardware resource parameters of a second satellite of the plurality of satellites;
based on the prioritization scores and based on a joint utility of objective completion given the first hardware resource parameters and the second hardware resource parameters:
allocating a first subset of the multiple objectives to the first satellite, and
allocating a second subset of the multiple objectives to the second satellite, wherein the first and second subsets of the multiple objectives each include at least one objective that is not included in the other subset;
causing the first satellite to perform a first operation corresponding to the first subset of the multiple objectives; and
causing the second satellite to perform a second operation corresponding to the second subset of the multiple objectives.

30. A non-transitory, computer-readable medium storing one or more instructions that, when executed by one or more processors, cause the one or more processors to perform operations comprising:
identifying (i) multiple objectives corresponding to one or more tasks to be performed using a plurality of satellites, (ii) prioritization scores representing respective prioritizations of the multiple objectives, and (iii) hardware resource parameters associated with execution capabilities of the plurality of satellites, including first hardware resource parameters of a first satellite of the plurality of satellites and second hardware resource parameters of a second satellite of the plurality of satellites;
based on the prioritization scores and based on a joint utility of objective completion given the first hardware resource parameters and the second hardware resource parameters:
allocating a first subset of the multiple objectives to the first satellite, and
allocating a second subset of the multiple objectives to the second satellite, wherein the first and second subsets of the multiple objectives each include at least one objective that is not included in the other subset;
causing the first satellite to perform a first operation corresponding to the first subset of the multiple objectives; and
causing the second satellite to perform a second operation corresponding to the second subset of the multiple objectives.

* * * * *